United States Patent
Harris et al.

(10) Patent No.: US 7,158,502 B2
(45) Date of Patent: Jan. 2, 2007

(54) SLOT CYCLE ASSIGNMENT WITHIN A COMMUNICATION SYSTEM

(75) Inventors: John M. Harris, Chicago, IL (US); Sean Kelley, Hoffman Estates, IL (US); Daniel De Clerck, Lake Barrington, IL (US); Philip Joseph Fleming, Glen Ellyn, IL (US); Stephen Spear, Skokie, IL (US); Ronald Thomas Crocker, St Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 891 days.

(21) Appl. No.: 09/881,337

(22) Filed: Jun. 14, 2001

(65) Prior Publication Data

US 2002/0191583 A1 Dec. 19, 2002

(51) Int. Cl.
*H04J 3/00* (2006.01)

(52) U.S. Cl. .......... 370/345; 455/518; 455/519

(58) Field of Classification Search ........ 370/345, 370/458, 311, 328, 330, 335, 336, 337, 342, 370/459, 344, 320, 461, 462, 441, 442, 340, 370/347, 341, 346, 326, 329, 314, 321, 312, 370/532, 498, 508, 276, 277, 348, 431, 432, 370/437; 455/78, 416, 518, 519, 526.1, 569.1
See application file for complete search history.

(56) References Cited

U.S. PATENT DOCUMENTS

| | | | |
|---|---|---|---|
| 5,452,288 A * | 9/1995 | Rahuel et al. ............. 370/203 |
| 5,475,689 A * | 12/1995 | Kay et al. ................ 370/337 |
| 5,511,067 A * | 4/1996 | Miller ..................... 370/335 |
| 5,596,571 A * | 1/1997 | Gould et al. ............. 370/335 |
| 5,673,259 A * | 9/1997 | Quick, Jr. ................ 370/342 |
| 5,749,056 A * | 5/1998 | Patterson et al. ........ 455/569.1 |
| 5,881,370 A * | 3/1999 | Pottala et al. ............ 455/78 |
| 6,421,540 B1 * | 7/2002 | Gilhousen et al. ........ 455/458 |
| 6,480,504 B1 * | 11/2002 | Wang et al. .............. 370/442 |
| 6,577,680 B1 * | 6/2003 | Wake et al. ............. 375/240.14 |
| 6,662,010 B1 * | 12/2003 | Tseitlin et al. .......... 455/426.1 |
| 6,829,493 B1 * | 12/2004 | Hunzinger ............... 455/574 |
| 6,832,094 B1 * | 12/2004 | Butler et al. ............ 455/458 |
| 6,930,994 B1 * | 8/2005 | Stubbs .................... 370/348 |
| 2002/0093920 A1 * | 7/2002 | Neufeld et al. ........... 370/311 |
| 2002/0172169 A1 * | 11/2002 | Rosen et al. ............. 370/335 |
| 2002/0181423 A1 * | 12/2002 | Chen et al. .............. 370/337 |

* cited by examiner

*Primary Examiner*—Phirin Sam

(57) ABSTRACT

To address the need for a dispatch mobile (303, 305, 307) to more quickly make a call, in the preferred embodiment of the present invention those remote units operating in a dispatch mode (303, 305, 307) will receive a first slot cycle, while those remote units not operating in a dispatch mode (302, 304, 306, 308) will receive a second slot cycle. The second slot cycle is greater than the first slot cycle, so that those remote units operating in dispatch mode (303, 305, 307) will "wake up" during the slot cycle normally utilized for interconnect calls. Because shorter slot cycles are utilized for remote units operating in dispatch mode (303, 305, 307), the time it takes to make a dispatch call is greatly reduced. Additionally the minimum slot cycle duration typically used for standard calls remains unchanged, greatly conserving battery life.

15 Claims, 3 Drawing Sheets

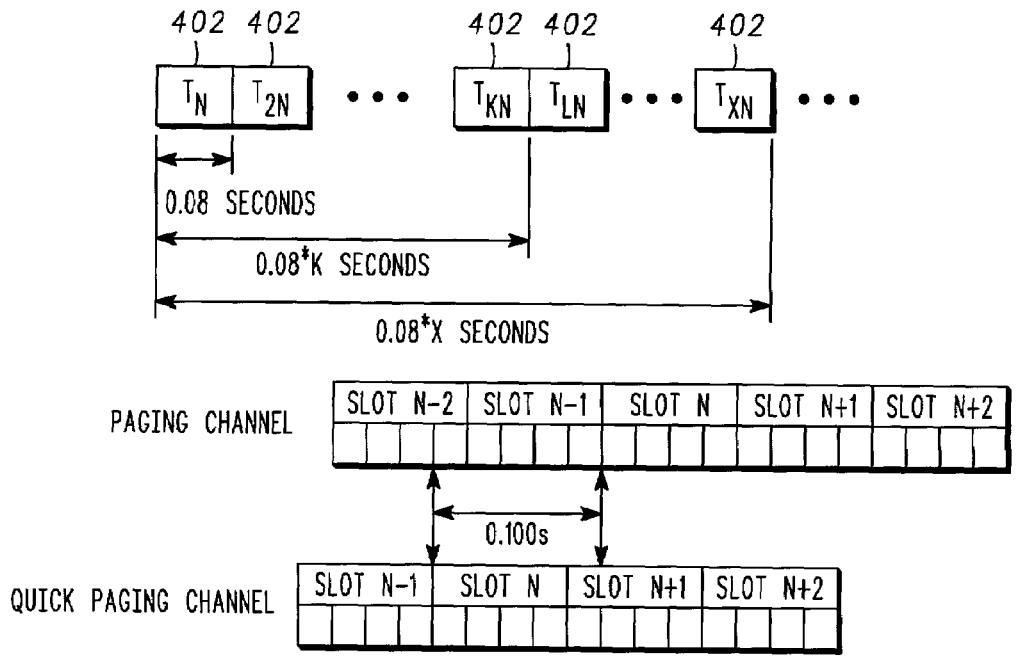
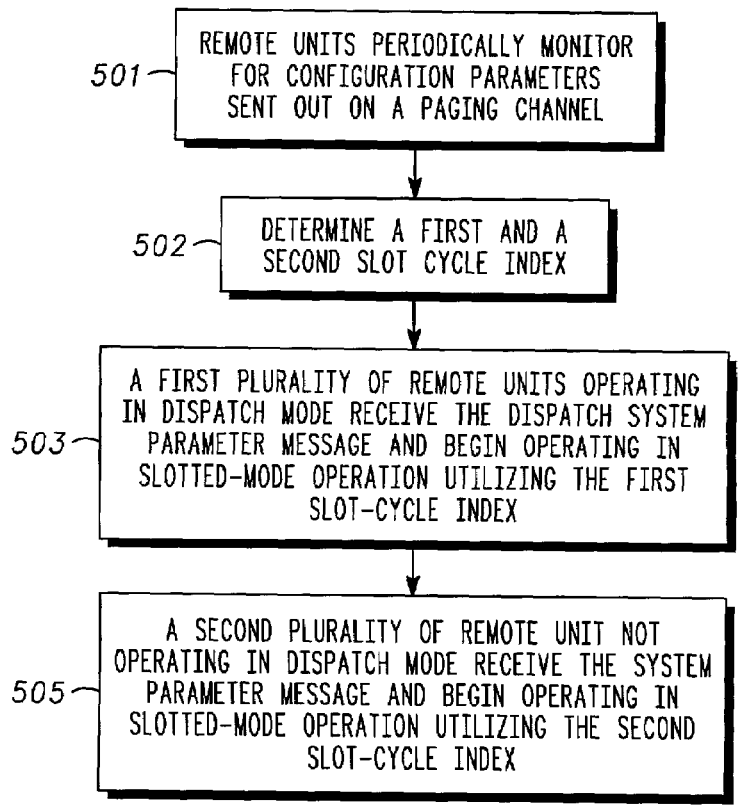
FIG.5

SLOT CYCLE ASSIGNMENT WITHIN A COMMUNICATION SYSTEM

FIELD OF THE INVENTION

The present invention relates generally to communication systems and in particular, to a method and apparatus for assigning a slot-cycle within a communication system.

BACKGROUND OF THE INVENTION

Many conventional receivers, when operating in "idle" mode, "wake up" periodically to determine if any messages (pages) are scheduled to be transmitted to the receiver. If no messages are scheduled, the receiver will power down in order to extend the battery life of the receiver. One such communication system currently being developed with such power-saving capabilities is the next generation Code-Division Multiple-Access (CDMA) cellular communication system, more commonly referred to as cdma2000, or IS-2000. As illustrated in FIG. 1, cdma2000 utilizes a plurality of 20 millisecond (ms) synchronous frames 102 (shown as $F_0$, $F_1$, $F_2$, ..., $F_K$). Frames 102 are transmitted during a periodically occurring time span corresponding to a transmission cycle which has a predetermined duration (e.g., $16*0.080*2^N$ seconds, where N is zero or a positive integer). These frames are grouped together into a slot containing four frames. A mobile station within a cdma2000 system is assigned a particular slot in which all unsolicited messages for the particular mobile station are to be transmitted. A mobile station operating as such is said to be operating in a "slotted mode." Slotted mode operation allows a cdma2000 mobile station to power up for a single assigned paging slot every $1.28*2^N$ seconds.

In order to further conserve power, all addresses for mobile stations that are to receive messages during a particular slot are broadcast prior to broadcasting page data. If a mobile station's address is not broadcast, the mobile station can power down for the remainder of the slot. FIG. 2 shows slot 200 having four frames. As shown, a first portion 201 of slot 200 contains address information for all mobile stations that have page data within slot 200. A particular mobile station assigned to slot 200 will awake during the transmission time for slot 200. The mobile station will receive the first frame, and if the mobile station's address is not contained within the first portion 201 of slot 200, the mobile station will power down prior to receiving the rest of slot 200. After a period of time, the mobile will power up again and repeat the process.

Recently it has been proposed to add dispatch capabilities to the cdma2000 system. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

A problem encountered when dispatch capabilities are added to a system capable of slotted mode operation is that the minimum slot cycle duration typically used for standard calls is unacceptably long for those remote units operating in dispatch mode. More particularly, because the minimum slot cycle duration is 1.28 seconds, there is on average a 640 ms delay when paging the mobile. Although this 640 ms delay is acceptable for a typical interconnect voice call, it is not acceptable for dispatch services which rely on a very fast connection being made to the called party.

Because of this, a need exists for a method and apparatus for assigning a slot cycle that reduces the time it takes to make a dispatch call.

BRIEF DESCRIPTION OF THE DRAWINGS

FIG. 4 illustrates a slot cycle in accordance with the preferred embodiment of the present invention.

FIG. 5 is a flow chart showing operation of the communication system of FIG. 3 in accordance with the preferred embodiment of the present invention.

DETAILED DESCRIPTION OF THE DRAWINGS

To address the need for a dispatch mobile to more quickly make a call, in the preferred embodiment of the present invention those remote units operating in a dispatch mode will receive a first slot cycle, while those remote units not operating in a dispatch mode will receive a second slot cycle, while those remote units operating in both dispatch and interconnect mode will receive both the first slot cycle and the second slot cycle. Because shorter slot cycles are utilized for remote units operating in dispatch mode, the time it takes to make a dispatch call is greatly reduced. Additionally the slot cycle typically used for standard calls (i.e., second slot cycle) remains unchanged, maintaining battery life in that mode of operation.

The present invention encompasses a method for assigning a slot cycle within a communication system. The method comprising the steps of determining a first slot cycle for a first plurality of remote units, and determining a second slot cycle for a second plurality of remote units. The first slot cycle is assigned to the first plurality of remote units and the second slot cycle is assigned to the second plurality of remote units.

The present invention additionally encompasses a method comprising the steps of determining a mode of operation, receiving a first slot cycle, receiving a second slot cycle, and using the first slot cycle when operating in a first mode of operation otherwise using the second slot cycle when operating in a second mode of operation.

The present invention additionally encompasses an apparatus comprising first transmission circuitry having as an input, a first slot cycle, the first transmission circuitry broadcasting the first slot cycle to a first plurality of remote units utilizing a first mode of operation, and second transmission circuitry having as an input, a second slot cycle, the second transmission circuitry broadcasting the second slot cycle to a second plurality of remote units utilizing a second mode of operation.

The present invention additionally encompasses an apparatus comprising a receiver receiving a first and a second slot cycle, and logic circuitry coupled to the receiver, the logic circuitry determining a mode of operation and utilizes the first slot cycle when operating in a first mode of operation, otherwise utilizes the second slot cycle when operating in a second mode of operation.

Figure 1:
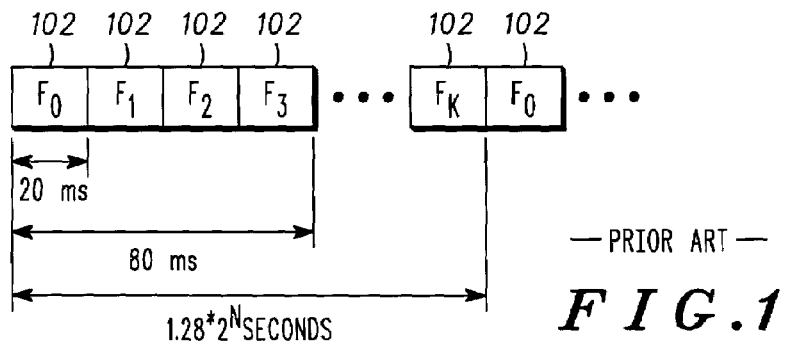
FIG. 1 and FIG. 2 illustrate a prior-art transmission scheme for cdma2000.
Figure 2:
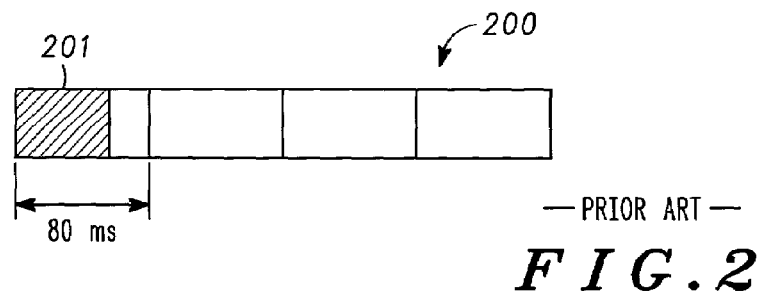
Figure 3:
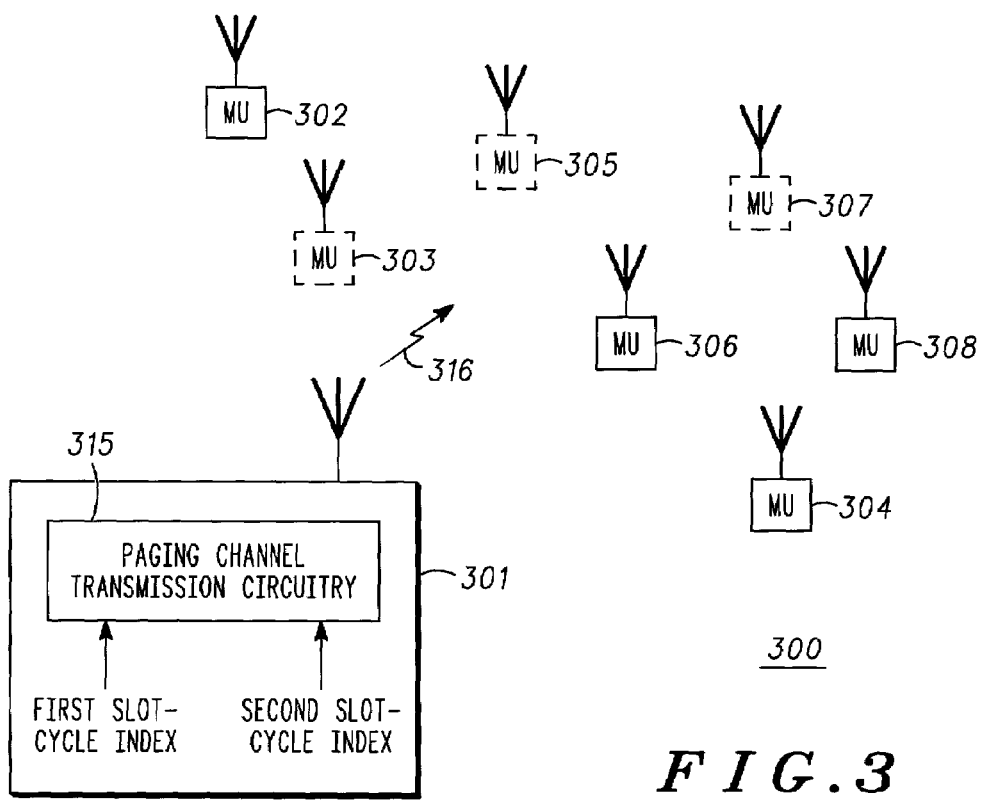
FIG. 3 is a block diagram of a communication system in accordance with the preferred embodiment of the present invention.

FIG. 3 illustrates a wireless communication system in accordance with the preferred embodiment of the present invention. In the preferred embodiment of the present invention, communication system 300 utilizes a Code Division Multiple Access (CDMA) system protocol as described in Cellular System Remote unit-Base Station Compatibility Standard of the Electronic Industry Association/Telecommunications Industry Association Interim Standard 2000 (IS2000), which is incorporated by reference herein. (EIA/TIA can be contacted at 2001 Pennsylvania Ave. NW Washington D.C. 20006). In alternate embodiments communication system 300 may utilize other cellular communication system protocols such as but not limited to the Global System for Mobile Communications (GSM) protocol, IS-136, IS-95, IS-833.

Communication system 300 includes base station 301, and remote (or mobile) units 302–308. Base station 301 includes paging channel circuitry 315 for broadcasting information via a paging channel 316. For illustration purposes, remote units 303, 305, and 307 are capable of both dispatch and interconnect operation and are operating in a "dispatch aware" mode awaiting dispatch calls, while remote units 302, 304, 306, and 308 are incapable of receiving dispatch calls. In the preferred embodiment of the present invention remote units 302, 304, 306 and 308 may be units without dispatch capabilities or simply may be dispatch capable units operating in a purely non-dispatch mode. In the preferred embodiment of the present invention, all network elements are available from Motorola, Inc. (Motorola Inc. is located at 1301 East Algonquin Road, Schaumburg, Ill. 60196). It is contemplated that base station 301 and remote units 302–308 within communication system 300 are configured in well known manners with processors, memories, instruction sets, and the like, which function in any suitable manner to perform the function set forth herein.

Operation of communication system 300 occurs as follows: Remote units within communication system 300 continuously receive a maximum slot cycle along with other configuration parameters sent out on a paging channel 316, commonly referred to as a Paging Channel (PCH) or Forward Common Control Channel (F-CCCH) 316. After receiving the maximum slot cycle parameter, along with other information, the remote unit will compute and store a preferred slot cycle, and will register with the system this preferred slot cycle. This preferred value is stored by the system as the slot cycle to be used when sending unsolicited messages to this particular remote unit. In order to ensure that stored configuration parameter values are always up-to-date after idle handoffs, current cdma2000 procedures require that a mobile station always wake up for Paging Channel transmissions 316 following an idle handoff, as described in section 2.6.2.1.4.2 of TR45.5.2.3.SIG/98.12.01.02. In the preferred embodiment of the present invention those remote units capable of operating in a dispatch mode will receive both a first slot cycle (for use with the dispatch mode of operation) and a second slot cycle (for use in non-dispatch mode), while those remote units not capable of operating in a dispatch mode will receive only a second slot cycle.

Because shorter slot cycles are utilized for remote units operating in dispatch mode, the time it takes to make a dispatch call is greatly reduced. Additionally the minimum slot cycle duration typically used for standard calls remains unchanged, greatly conserving battery life in those units without dispatch capability and those with dispatch capability which are not in dispatch mode.

Slot cycles are illustrated for both dispatch mode and non-dispatch mode remote units in FIG. 4. Shown in FIG. 4 is a plurality of slots 402. As discussed above, each slot cycle comprises a plurality of slots 402 that are transmitted during a periodically occurring time span corresponding to a transmission cycle which has a predetermined duration (e.g., 0.08*N seconds, where N is the slot cycle duration in slots). In the preferred embodiment of the present invention the slot cycle (N) is an integer ranging from 1 to 16.

Once a remote unit receives its maximum slot cycle, it will determine an appropriate slot cycle (no greater than the maximum) and power up during at least a portion of the slot cycle to determine if its address is included in the slot. If a mobile station's address is not broadcast, the mobile station can power down for the remainder of the slot and remain powered down until the next possible slot in which it can receive a message, which is the lesser of the current slot cycle less 1 slot or the time until the next slot from the other slot cycle. After this duration, the mobile will power up again and repeat the process. If the mobile station's address is included in the slot, it will receive and process the message as expected, as described, for example, in TIk/EIA/IS-2000.5-A, section 2.6.2.3.

A further mechanism to conserve power also exists in the cdma2000 system. As shown in FIG. 4, the "Quick Paging Channel" (QPCH), provides a positive indication to a mobile station that an unsolicited message is scheduled to arrive in the next paging slot. The QPCH slot is broadcast 0.100 seconds in advance of the paging slot it represents, giving the mobile station ample time to determine that it must indeed receive the paging channel. When the QPCH indication is determined to be negative, the mobile station can stop receiving until the next scheduled slot. If the QPCH indication is not determined to be negative, the mobile station will continue and receive the paging channel message in the corresponding slot. The QPCH is unaware of the nature of the message intended for the remote unit, but rather is aware only of the presence or absence of such a message. Since the operating rate of the QPCH is similar to the paging channel, maintaining the same slot rate (i.e., one slot every 0.08 seconds) allows this invention to work with the QPCH mechanism, further improving battery life savings for dispatch mode 1.

In the preferred embodiment of the present invention those remote units that are operating in dispatch mode (e.g., remote units 303, 305, and 307) will operate utilizing both a first slot cycle (e.g., K) and a second slot cycle (e.g., X). Therefore, in accordance with the preferred embodiment of the present invention each remote unit operating in dispatch mode will awake every 0.08*K seconds as well as every 0.08*X seconds. When the 0.08*K seconds and 0.08*X seconds represent the same slot, the remote unit will process both kinds of messages (i.e., those that would arrive during the first slot cycle as well as those that would arrive during the second slot cycle). Additionally, those remote units not operating in dispatch mode (e.g., remote units 302, 304, 306, and 308) will operate utilizing only a second slot cycle (e.g., X), awaking every 0.08*X seconds.

FIG. 5 is a flow chart showing operation of the communication system of FIG. 3 in accordance with the preferred embodiment of the present invention. The logic flow begins at step 501 where all remote units periodically monitor for configuration parameters sent out on a paging channel. In particular, paging channel circuitry 315 receives maximum slot cycles and continuously broadcasts the slot cycles along with other configuration parameters via paging channel 316. In order to ensure that stored configuration parameter values are always up-to-date after idle handoffs, current cdma2000 procedures require that a mobile station always wake up for the regular Paging Channel following an idle handoff. In the preferred embodiment of the present invention two messages are periodically broadcast from base station 301 via paging channel circuitry 315. The first message, broadcast by first paging channel circuitry is a dispatch system parameter message. This message contains a first maximum slot cycle for utilization by remote units operating in dispatch mode. The second message broadcast by second paging channel circuitry (which may utilize the same circuitry as the first paging channel) is a system parameter message as described in TIA/EIA/IS-2000.5-A, section 3.7.2.3.2.1. "System Parameters Message". This message contains a second maximum slot cycle for utilization by remote units not operating in dispatch mode.

Continuing, at step 502, base station 301 determines a first and a second maximum slot cycle and broadcasts the first and the second slot cycle via a paging channel. As discussed above, the first slot cycle is to be utilized by those remote units operating in a dispatch mode, while the second slot cycle is to be utilized by those remote units operating in a non-dispatch mode. At step 503 a first plurality of remote units operating in dispatch mode receive the dispatch system parameter message and begin operating in slotted-mode operation utilizing a slot cycle no greater than the first maximum slot cycle. At step 505 a second plurality of remote units not operating in dispatch mode receive the system parameter message and begin operating in slotted-mode operation utilizing a second slot cycle no greater than the second maximum slot cycle.

Because shorter slot cycles are utilized for remote units operating in dispatch mode, the time it takes to make a dispatch call is greatly reduced. Although remote units operating in dispatch mode awake more frequently, the minimum slot cycle duration typically used for standard calls remains unchanged, greatly conserving battery life for non-dispatch mode remote units.

Figure 6:
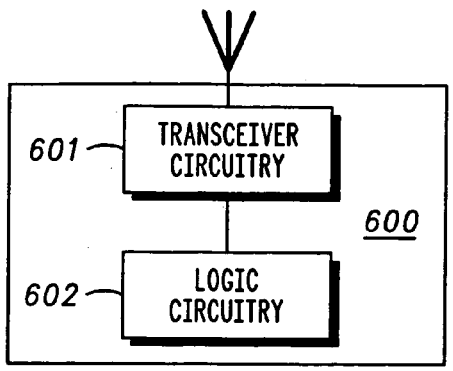
FIG. 6 is a block diagram of a remote unit in accordance with the preferred embodiment of the present invention.
Figure 7:
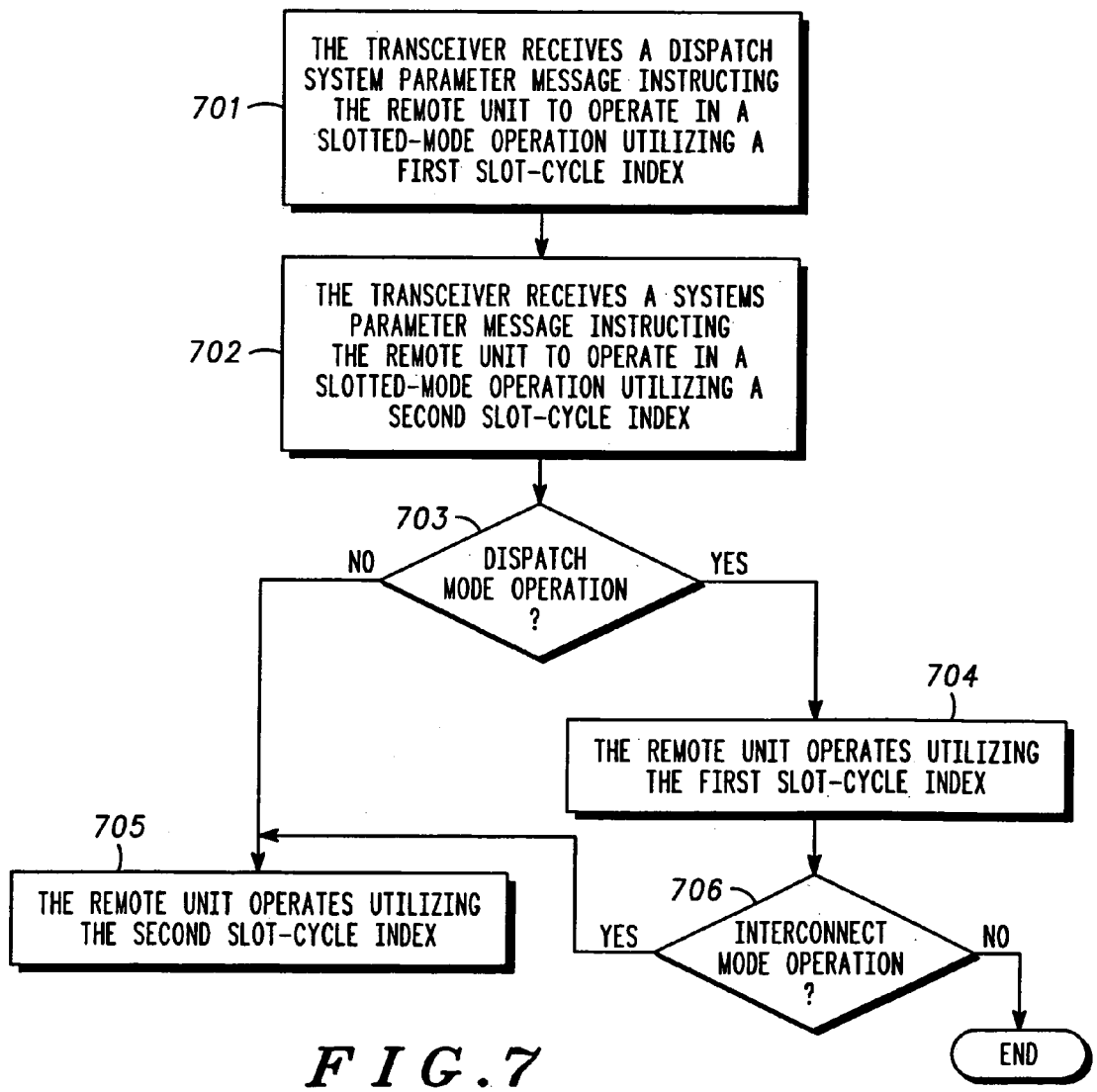
FIG. 7 is a flow chart showing operation of the remote unit of FIG. 6 in accordance with the preferred embodiment of the present invention.

FIG. 6 is a block diagram of remote unit 600 in accordance with the preferred embodiment of the present invention. As shown, remote unit 600 comprises transceiver circuitry 601 and logic circuitry 602. In the preferred embodiment of the present invention transceiver circuitry 601 is standard transceiver circuitry known in the art, and may or may not be capable of operating in dispatch mode. Logic circuitry 602 serves to determine the appropriate slot cycle and periodically awake transceiver circuitry 601 during slotted-mode operation. Operation of remote unit 600 in accordance with the preferred embodiment of the present invention occurs as illustrated in FIG. 7.

At step 701 transceiver 601 receives a dispatch system parameter message instructing remote unit 600 to operate in a slotted-mode operation utilizing a first maximum slot cycle. Next, at step 702, transceiver 601 receives a systems parameter message instructing remote unit 600 to operate in a slotted-mode operation utilizing a second maximum slot cycle. At step 703 logic circuitry 602 determines a mode of operation. In particular, logic unit 602 determines if remote unit 600 will be operating in a dispatch mode or not. If, at step 703, it is determined that remote unit 600 will be operating in a first mode of operation (e.g., a dispatch mode) then the logic flow continues to step 704 where remote unit 600 operates utilizing the first maximum slot cycle, otherwise the logic flow continues to step 705 where remote unit 600 operates utilizing the second maximum slot cycle. In the preferred embodiment of the present invention when a remote unit is operating in both the dispatch mode, and a normal interconnect mode, both slot cycles will be utilized. Therefore, at step 706 it is determined if the remote unit will be operating in interconnect mode, and if so, the logic flow continues to step 705 where the first slot cycle is additionally used.

While the invention has been particularly shown and described with reference to a particular embodiment, it will be understood by those skilled in the art that various changes in form and details may be made therein without departing from the spirit and scope of the invention. For example, although the above embodiments where described with the base station sending out a maximum slot size and the mobile unit choosing its own slot size (no greater than the maximum), in an alternate embodiment the base station may simply broadcast the slot size to be utilized by the mobile. It is intended that such changes come within the scope of the following claims.

What is claimed is:

1. A method for assigning a slot cycle within a communication system, the method comprising the steps of:
    determining a duration of a first slot cycle for a first plurality of remote units that operate in a first service but not a second service;
    determining a duration of a second slot cycle for a second plurality of remote units that operate in the second service;
    assigning the first slot cycle duration to the first plurality of remote units; and
    assigning the second slot cycle duration to the second plurality of remote units.

2. The method of claim 1 wherein the step of assigning the first slot cycle duration to the first plurality of remote units comprises the step of transmitting a first message over a paging channel, the first message comprising the first slot cycle.

3. The method of claim 1 wherein the step of assigning the second slot cycle duration to the second plurality of remote units comprises the step of transmitting a second message over the paging channel, the second message comprising the second slot cycle.

4. The method of claim 1 wherein the first and second service taken from a group consisting of a dispatch mode of operation and a non-dispatch mode of operation.

5. A method comprising the steps of:
    determining a mode of operation;
    receiving a first slot cycle;
    receiving a second slot cycle; and
    using a duration of the first slot cycle when operating in a first mode of operation otherwise using a duration of the second slot cycle when operating in a second mode of operation.

6. The method of claim 5 wherein the step of determining the mode of operation comprises the step of determining a mode of operation taken from the group consisting of a dispatch mode of operation and a non-dispatch mode of operation.

7. The method of claim 5 wherein the step of using the duration of the first slot cycle when operating in the first mode of operation otherwise using the duration of the second slot cycle when operating in the second mode of operation, comprises the step of using the duration of the first slot cycle when operating in a dispatch only mode of operation, otherwise using the duration of the second slot cycle during a non-dispatch mode of operation.

8. The method of claim 5 wherein the step of using the duration of the first slot cycle when operating in a first mode of operation otherwise using the duration of the second slot cycle when operating in a second mode of operation further comprises the step of using both the duration of the first and the second slot cycles simultaneously when operating in both the first and second mode.

9. An apparatus comprising:
    first transmission circuitry having as an input, a first slot cycle duration the first transmission circuitry broadcasting the first slot cycle duration to a first plurality of remote units utilizing a first mode of operation; and
    second transmission circuitry having as an input, a second slot cycle duration, the second transmission circuitry broadcasting the second slot cycle duration to a second plurality of remote units utilizing a second mode of operation.

10. The apparatus of claim 9 wherein the first transmission circuitry is paging channel transmission circuitry.

11. The apparatus of claim 10 wherein the second transmission circuitry is paging channel transmission circuitry.

12. The apparatus of claim 9 wherein the first plurality of remote units comprise remote units operating in a dispatch mode.

13. The apparatus of claim 12 wherein the second plurality of remote units comprise remote units operating in a non-dispatch mode.

14. An apparatus comprising:
    a receiver receiving a first and a second slot cycle duration; and
    logic circuitry coupled to the receiver, the logic circuitry determining a mode of operation from the first and second slot cycle durations and utilizes the first slot cycle duration when operating in a first mode of operation, otherwise utilizes the second slot cycle duration when operating in a second mode of operation.

15. The apparatus of claim 14 wherein the logic circuitry utilizes the first slot cycle duration when operating in a dispatch mode, otherwise utilizes the second slot cycle duration when operating in a non-dispatch mode.

* * * * *